United States Patent [19]

Sasaki et al.

[11] 4,292,133
[45] Sep. 29, 1981

[54] METHOD OF AND APPARATUS FOR REPLACING CONTROL ROD DRIVE

[75] Inventors: Masayoshi Sasaki; Yoshimi Ishii; Tomiharu Yoshida, all of Hitachi; Sen Sugiyama, Ibaraki, all of Japan

[73] Assignee: Hitachi, Ltd., Tokyo, Japan

[21] Appl. No.: 23,902

[22] Filed: Mar. 26, 1979

[30] Foreign Application Priority Data

Mar. 24, 1978 [JP] Japan .................................. 53-33101
May 4, 1978 [JP] Japan .................................. 53-52754
Sep. 4, 1978 [JP] Japan .................................. 53-107643

[51] Int. Cl.³ ........................ G21C 19/20; G21C 7/08
[52] U.S. Cl. ..................................... 176/36 R; 176/30
[58] Field of Search ................................. 176/30, 36 R

[56] References Cited

U.S. PATENT DOCUMENTS 4,158,600 6/1979 Akimoto et al. ................... 176/36 R

FOREIGN PATENT DOCUMENTS 52-29596 3/1977 Japan ................................ 176/36 R

*Primary Examiner*—S. A. Cangialosi
*Attorney, Agent, or Firm*—Craig and Antonelli

[57] ABSTRACT

A control rod drive attaching and detaching device and a control rod drive handling device are mounted on a revolving device to be movable independently from each other. The control rod drive attaching and detaching device includes bolt handling means for loosening and tightening bolts for fastening a control rod drive to a pressure vessel of a nuclear reactor, coolant splash preventing means for disposing of coolant which flows from the control rod drive when the latter is detached from the pressure vessel, and uncoupling means for uncoupling a control rod from the control rod drive. The control rod drive handling device includes a column pivotally mounted on a carriage, a cart removably mounted on the column, and means for moving the column to a horizontal position. Each control rod drive mounted to the pressure vessel of the nuclear reactor is detached from the pressure vessel by the control rod attaching and detaching device and transferred to the cart of the control rod drive handling device. The column is moved to a horizontal position, and the cart with the control rod drive supported thereon is removed from the column.

28 Claims, 25 Drawing Figures

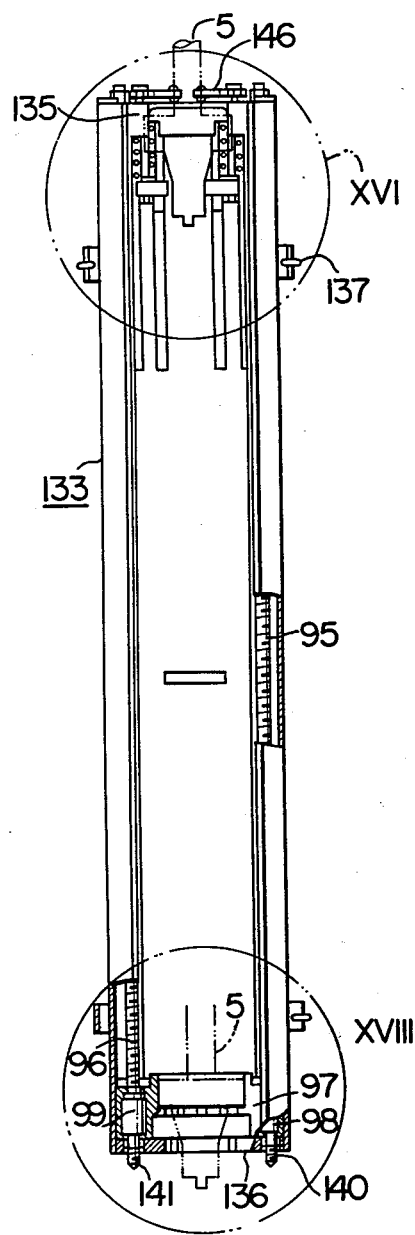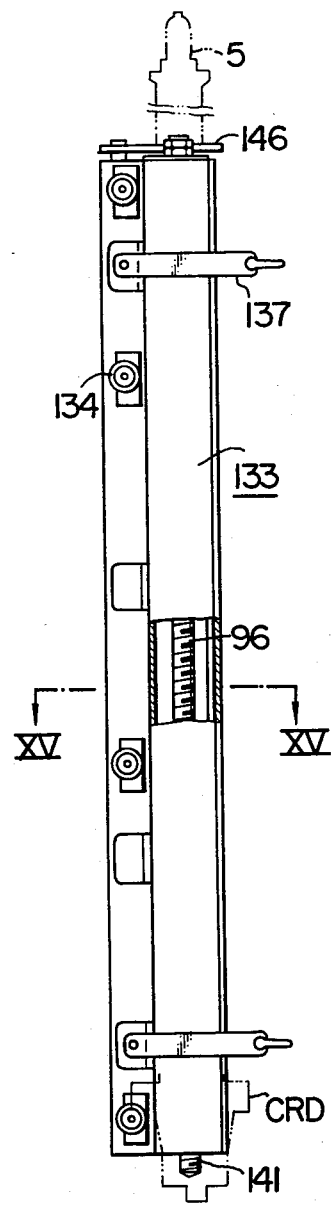

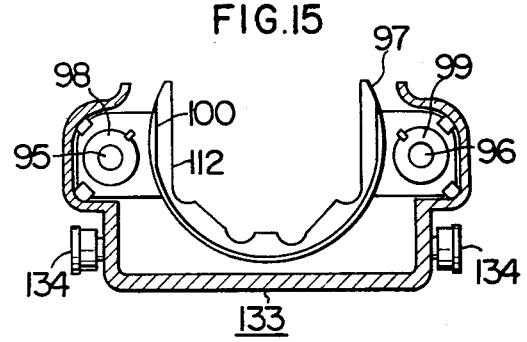
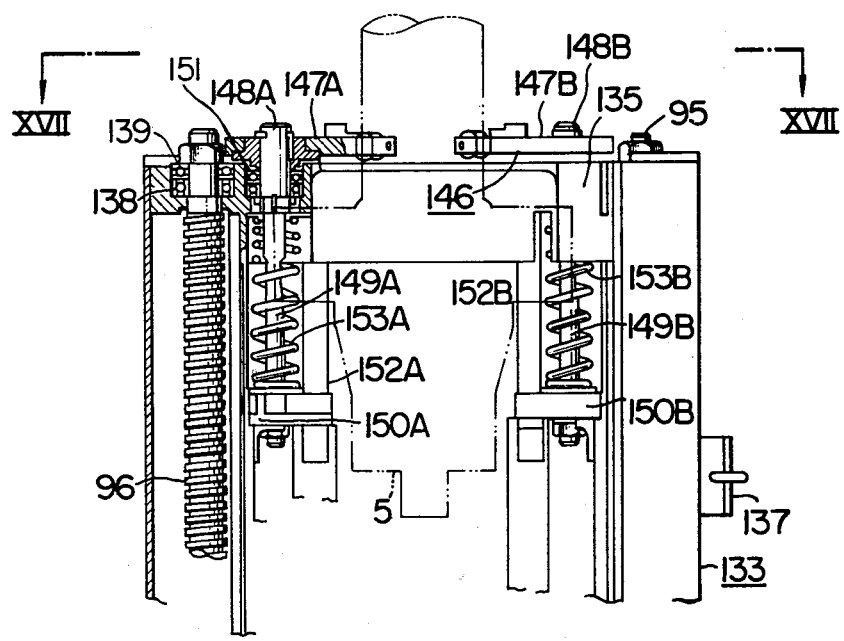

METHOD OF AND APPARATUS FOR REPLACING CONTROL ROD DRIVE

BACKGROUND OF THE INVENTION

1. Field of the Invention

This invention relates to a method of and an apparatus for replacing control rod drives of nuclear reactors, and more particularly to a method of and an apparatus for replacing a control rod which enables the achievement of a compact design of a control rod drive replacing apparatus.

2. Description of the Prior Art

In order to drive control rods inserted in a pressure vessel of a nuclear reactor, the nuclear reactor is provided with a control rod driving mechanism including control rod drives each coupled to one each of the control rods in the pressure vessel. The control rod drive (hereinafter referred to as a CRD) is regularly inspected and maintained so that the operation of the control rods can be performed smoothly under trouble-free condition while the nuclear reactor is in operation.

In a boiling-water reactor, the CRDs are each mounted in a CRD housing attached to the bottom of the pressure vessel. Thus, difficulties are encountered in detaching each CRD from the pressure vessel and attaching the same again to the pressure vessel, for carrying out inspection and maintenance of each CRD. More specifically, a space in a pedestal below the pressure vessel in which the CRDs are mounted is one of the regions in which the level of radioactivity is very high, so that the aforesaid CRD attaching and detaching are carried out by the operator wearing protective clothing. This makes the attaching and detaching operation time-consuming and puts a strain on the operator who runs the risk of exposure to radiation.

Proposals have been made to mechanize the operation of attaching and detaching the CRD so as to automatically carry out a CRD replacing operation. One of such proposals is disclosed in U.S. Pat. Ser. No. 778,168, now U.S. Pat. No. 4,158,600, and Japanese Patent Application, Laid-open No. 140793/77 which describe a CRD replacing apparatus comprising a CRD attaching and detaching device and a CRD gripping device which are movable along a column which is pivotally mounted on a carriage arranged on a revolving carriage. The arrangement in which the CRD attaching and detaching device and the CRD gripping device are mounted on the column makes it necessary to move the CRD attaching and detaching device to the lowermost end of the column when a CRD is moved between the CRD attaching and detaching device and the CRD gripping device. As a result, it becomes necessary to increase the length of the column and hence to increase the distance between the bottom of the space within the pedestal in which the CRD replacing apparatus is installed and the lower end of each CRD attached to the respective CRD housing. This results in an increase in the height of the pedestal which supports the pressure vessel of the nuclear reactor, thereby deteriorating the ability of the nuclear reactor to withstand the shock of earthquakes. Also, the use of a column of a large length raises the problem of how to move the column to a horizontal position without any trouble. The solution of this problem entails an increase in the diameter of the space within the pedestal. Thus, the CRD replacing apparatus of the prior art becomes large in size, and the space within the pedestal for installing the apparatus therein should be increased. At the same time, it is not easy to move the CRD replacing apparatus of a large size from the space within the pedestal to outside, so as to effect inspection and maintenance.

SUMMARY OF THE INVENTION

An object of this invention is to provide a CRD replacing apparatus which is compact in overall size.

Another object of the invention is to minimize the process steps which should be followed in replacing a CRD.

Still another object of the invention is to provide a CRD replacing apparatus which facilitates the movement of CRD conveying means which had been removed from the CRD handling device.

Still another object of the invention is to provide a CRD replacing apparatus which enables opening and closing of the CRD gripping mechanism to be effected positively without using any special control means.

A further object of the invention is to provide a CRD replacing apparatus comprising a CRD attaching and detaching device provided therein with coolant release passages.

The characteristic feature of the invention reside in that a CRD attached to a pressure vessel of a nuclear reactor is detached by a CRD attaching and detaching device movable on a revolving device, a CRD handling device movable on the revolving device independently of the CRD attaching and detaching device is moved into contact with the CRD attaching and detaching device so as to transfer the CRD from the CRD attaching and detaching device to the CRD handling device, and the CRD supported on the CRD handling device in a vertical position is moved to a horizontal position by the operation of the CRD handling device, after the CRD handling device is separated from the CRD attaching and detaching device.

By virtue of the aforesaid feature, the height of the CRD handling device is reduced, thereby enabling a compact overall size to be obtained in a CRD replacing apparatus.

Preferably, the CRD is transferred from the CRD attaching and detaching device to CRD conveying means detachably attached to the CRD handling device to function as part thereof, and the CRD is moved to a horizontal position together with the CRD conveying means by the operation of the CRD handling device, so that the CRD conveying means can be removed from the CRD handling device while supporting the CRD thereon.

The advantages offered by the invention include a reduction in the number of process steps that should be followed in carrying out a CRD replacing operation, a reduced risk for the operator of being exposed to radiation, and a marked reduction in time required for replacing the CRD.

BRIEF DESCRIPTION OF THE DRAWINGS

FIG. 13 is a plan view of the cart of the CRD handling device;

FIG. 14 is a side view of the cart shown in FIG. 13;

FIG. 15 is a sectional view taken along the line XV-XV in FIG. 14;

FIG. 16 is a view, on an enlarged scale, of the portion designated by XVI in FIG. 13;

DESCRIPTION OF THE PREFERRED EMBODIMENTS

Figure 1:
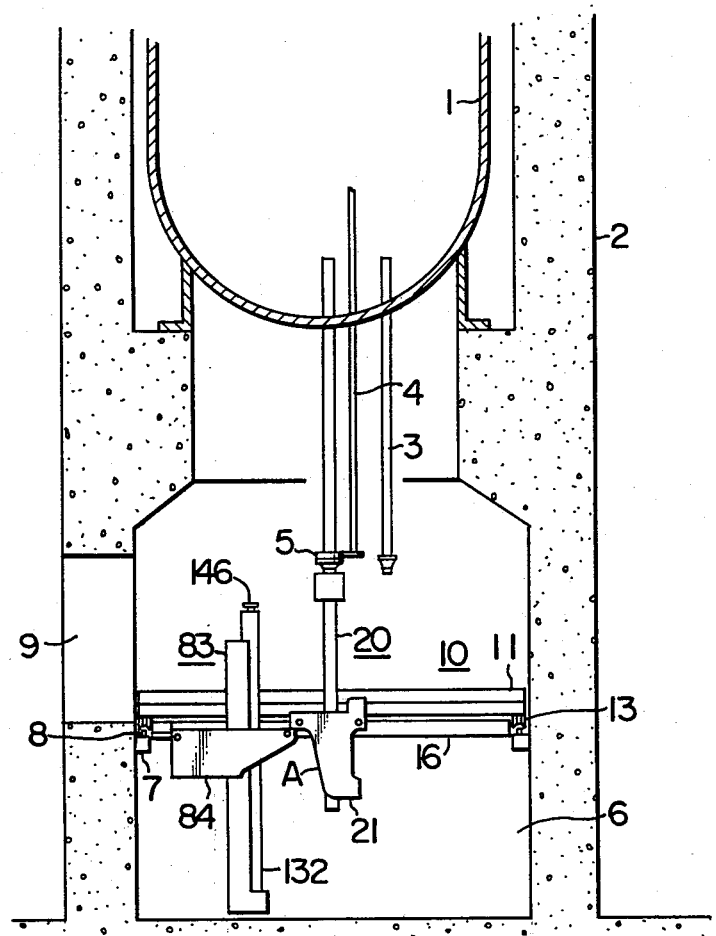
FIG. 1 is a side view of a CRD replacing apparatus according to a preferred embodiment of the invention.

A preferred embodiment of the invention will now be described by referring to FIG. 1. A pressure vessel 1 of a nuclear reactor is installed on a pedestal 2 arranged in a containment vessel, not shown, and has a plurality of CRD housings 3 and a plurality of neutron flux measuring instrument housings 4 (only one is shown) which project into the lower portion of the pressure vessel 1. A CRD 5 is installed in the CRD housings 3 which, together with the neutron flux measuring instrument housings 4, constitute part of the pressure vessel 1. The pedestal 2 defines a space 6 disposed beneath the pressure vessel 1 and is formed therein with an opening 9 for carrying therethrough a CRD 5 into and out of the space 6. The pedestal 2 has mounted on its inner wall surface a bracket 7 which projects inwardly into the space 6 and has an annular rail 8 mounted thereon for movably supporting a revolving device 11.

A CRD replacing apparatus generally designated by the reference numeral 10 comprises a CRD attaching and detaching device 20 and a CRD handling device 83, in addition to the revolving device 11.

Figure 2:
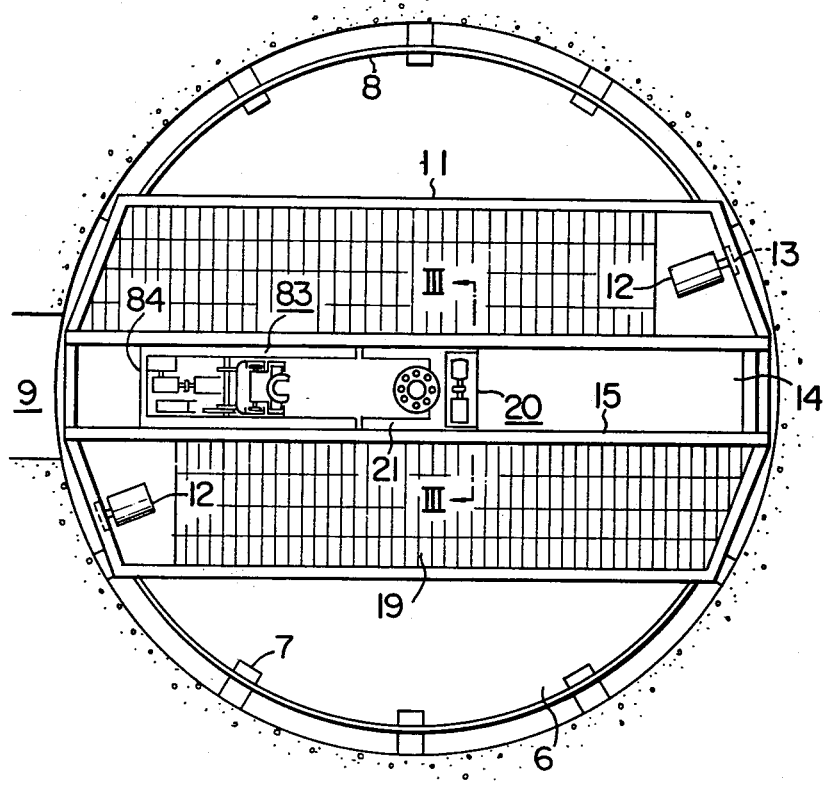
FIG. 2 is a plan view of the revolving device shown in FIG. 1.
Figure 3:
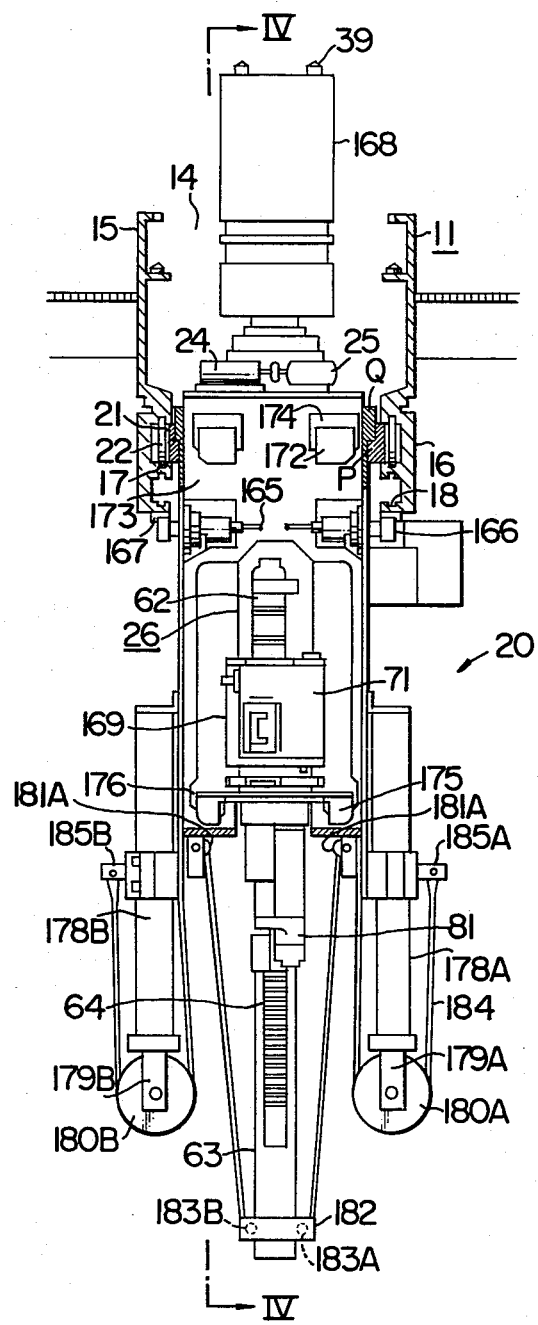
FIG. 3 is a sectional view taken along the line III-III in FIG. 2.

The revolving device 11 will be outlined by referring to FIGS. 2 and 3. As shown, the revolving device 11 comprises drive motors 12 each connected to a wheel 13 supported on the annular rail 8. The revolving device 11 also comprises a pair of frames 15 arranged in spaced parallel relation to define therebetween a guide slot 14. The frames 15 each have attached to the lower end thereof a guide rail 16 provided with one of rails 17 which guide wheels 22 of a carriage 21 of the CRD attaching and detaching device 20. Each guide rail 16 has, at its lower portion, one of rails 18 which guide wheels 85 (See FIG. 10) of a carriage 84 of the CRD handling device 83. A grating 19 is provided to the frames 15 of the revolving device 11.

Figure 4:
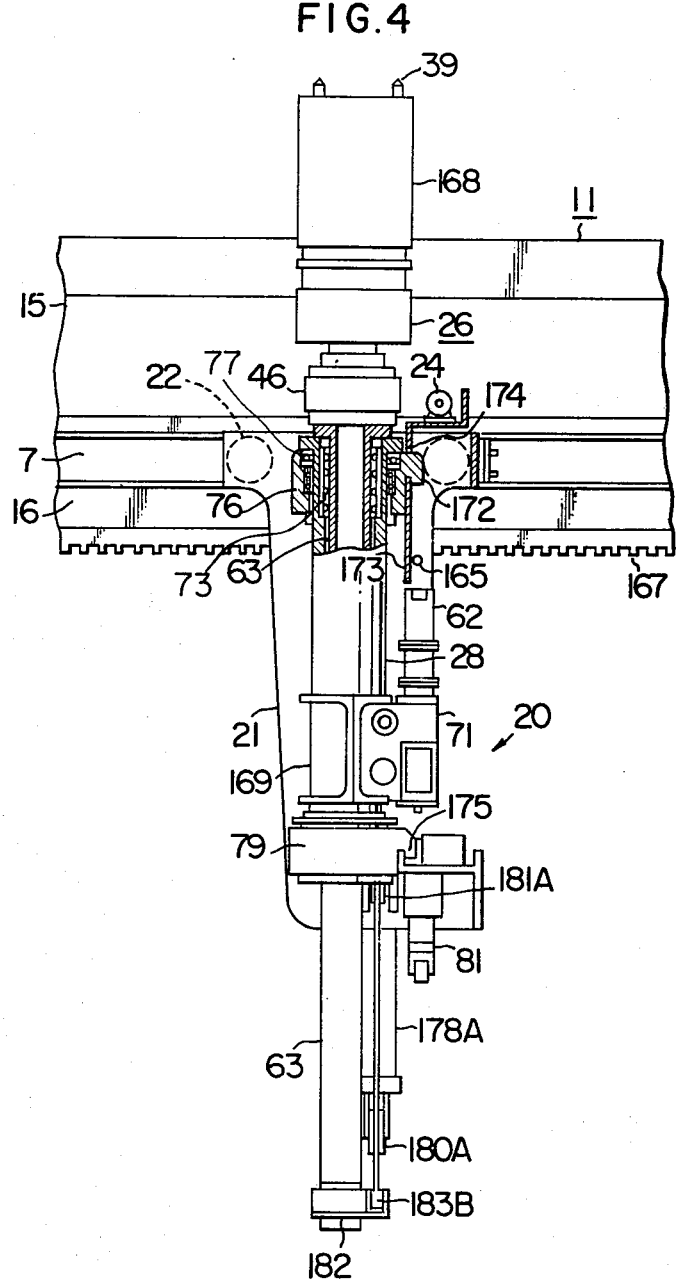
FIG. 4 is a sectional view taken along the line IV-IV in FIG. 3.

The CRD attaching and detaching device 20 will be described by referring to FIGS. 3 and 4. As shown, the CRD attaching and detaching device 20 comprises the carriage 21 having the wheels 22 supported on the rails 17. A motor 24 and speed reduction gearing 25 constitute driving means 23 mounted on the carriage 21. The motor 24 is connected through the speed reducing gearing 25 to a rotary shaft 165 supported by the carriage 21 and mounting on either end thereof a pinion 166 which is in meshing engagement with a rack 167 attached to the lower end of each rail 18. A portion Q of the carriage 21 is merely fitted in a portion P thereof, so that the portion Q can be readily removed from the portion P by lifting. The pinions 166 are slidable along the corresponding rotary shaft 165. When it is intended to lift the portion Q, the pinions 166 are slid along the rotary shafts 165 to avoid impinging of the pinions 166 against the portion P. By this arrangement, inspection and maintenance of the portion Q of the carriage 21 are facilitated.

Figure 5:
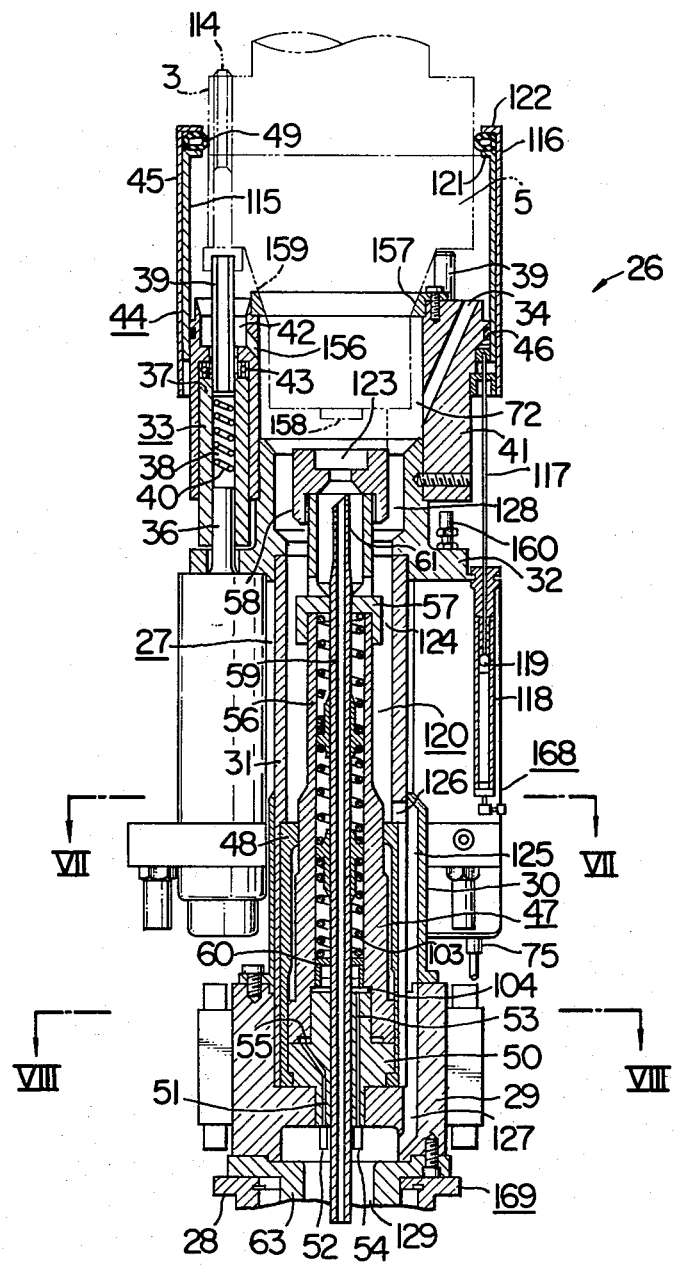
FIG. 5 is a vertical sectional view of the upper portion of the main body of the CRD attaching and detaching device shown in FIG. 4.
Figure 6:
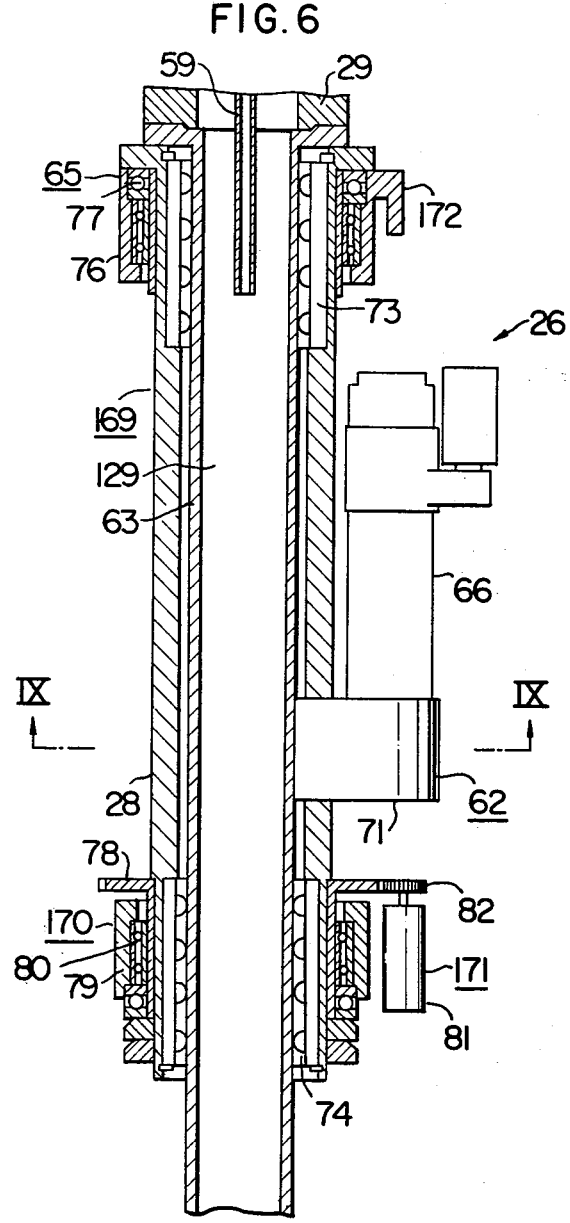
FIG. 6 is a vertical sectional view of the lower portion of the main body of the CRD attaching and detaching device shown in FIG. 4.
Figure 7:
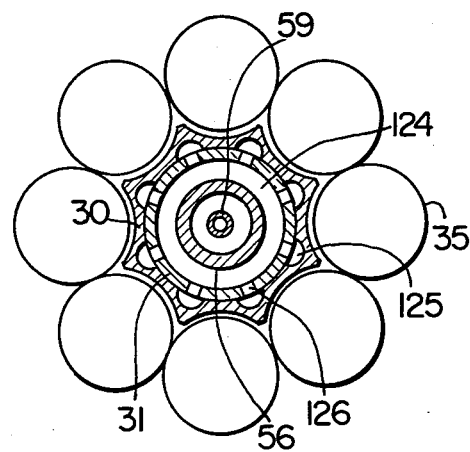
FIG. 7 is a sectional view taken along the line VII-VII in FIG. 5.
Figure 8:
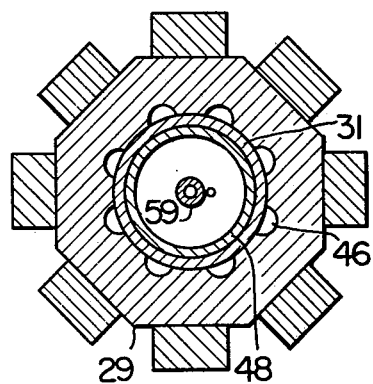
FIG. 8 is a sectional view taken along the line VIII-VIII in FIG. 5.

A main body 26 of the CRD attaching and detaching device 20 is detachably attached to the carriage 21 and includes an attaching and detaching head 168 and an attaching and detaching head support member 169. The main body 26 of the attaching and detaching device 20 will be described in detail hereunder by referring to FIGS. 5 and 6, wherein FIG. 5 shows the upper half portion of the main body 26 and FIG. 6 shows the lower half portion thereof. FIGS. 7 and 8 are sectional views taken along the lines VII-VII and VIII-VIII in FIG. 5, respectively.

The construction of the attaching and detaching head 168 will be first described. Mounted on the upper part of a housing 27 are connecting bolt handling means 33 for connecting and disconnecting the CRD housing 3 and the CRD 5 by bolts 114 (hereinafter referred to as CRD connecting bolts), and coolant splash preventing means 44 for recovering coolant leaking from the CRD housing 3. The housing 27 has mounted therein uncoupling means 47 for uncoupling the CRD 5 from a control rod, not shown, which is coupled to the upper end of the CRD 5. An elevational column 63 is mounted on the lower end of the housing 27.

The housing 27 includes a plurality of segments presently to be described. A lowermost housing segment 29 disposed in the lowermost portion of the housing 27 is supported by a flange at the upper end of the elevational column 63. Housing segments 30, 31 and 32 are disposed one over another on the lowermost housing segments 29 and secured to one another to prevent relative movement. The housing segment 32 is disposed at the uppermost portion of the housing 27.

An annular passage 128 is defined between the uppermost housing segment 32 and an adapter 58, and an annular passage 124 is defined between the housing segment 31 and a piston 56 subsequently to be described. Defined between the housing segments 31 and 30 are passages 125 which communicate with the annular passage 124 through openings 126 formed in the housing segment 31. Passages 127 are formed between the lowermost housing segment 29 and the housing segment 31.

The connecting bolt handling means 33 comprises air motors 35 each incorporating therein speed reduction gearing, and bolt wrenches 39. The air motors 35 are supported by a flange of the uppermost housing segment 32. The air motors 35 and bolt wrenches 39, which are provided in number equal to the connecting bolts 114 or eight in this embodiment, are located substantially equidistantly around the housing segment 31. Each air motor 35 has a rotary shaft 36 therein which is connected to a rotary shaft 37 having a space 38 therein for receiving one of the bolt wrenches 39. A coil spring 40 is mounted in the space 38 of each rotary shaft 37 to urge the bolt wrench 39 upwardly by its biasing force at all times. The rotary shafts 37 and bolt wrenches 39 are housed in a bolt housing 41 fixed around upper part of the uppermost housing segment 32, and angling ducts 34 are formed in the wall of the bolt housing 41 to extend from the upper end of the bolt housing 41 to a center space 72 in the bolt housing 41. A radial bearing 43 is mounted between each rotary shaft 37 and the bolt housing 41. The bolt housing 41 is formed in the upper portion of its wall with bolt holders 42 each receiving one of the bolt wrenches 39. The wall of the bolt housing 41 is formed with angling ducts 156 each communicating one of the bolt holders 42 with the space 72. 160 designates a vibrometer for ascertaining that the connecting bolts 114 have been removed.

The coolant splash preventing means 44 comprises a drain sleeve 45 composed of an inner drain sleeve 115 and an outer drain sleeve 116, a piston rod 117, an air cylinder 118, a piston 119 connected to the piston rod 117 in the air cylinder 118, and drains 120. The drain sleeve 45 is cylindrical in shape and arranged to surround the bolt housing 41. A packing 46 is mounted between the bolt housing 41 and the drain sleeve 45. The piston rod 117 which is connected to the drain sleeve 45 extends at its upper end portion through the lower end portion of the outer drain sleeve 116 and is attached to the lower end portion of the inner drain sleeve 115. A seal ring 49 is mounted between a ledge 121 at the upper end of the inner drain sleeve 115 and a ledge 122 at the upper end of the outer drain sleeve 116. The drains 120 are formed of the angling ducts 34 and 156, space 72, annular passages 128 and 124, openings 126, passages 125 and 127 and a bore 129 in the elevational column 63.

The uncoupling means 47 mounted in the housing 27 comprises a cylinder 48, a piston 56, and a detector 61, the cylinder 48 being housed in the housing segment 31 and having a plug 50 attached to its lower end to provide a seal to the cylinder 48. The plug 50 is formed therein with passages 51 and 53 connected to conduits 52 and 54 respectively. The piston 56 is inserted in the cylinder 48, and the passage 51 is connected to a space 55 defined between the plug 50 and the piston 56. Mounted in the upper portion of the piston 56 is a guide ring 57. The adapter 58 formed at its upper portion with an opening 123 is arranged on the guide ring 37, and a bore is formed in the central portions of the guide ring 57 and adapter 58. A tube 59 having a piston portion 60 is arranged in the pistons 56, with the pistons portion 60 being urged downwardly by the biasing force of a coil spring 103. The detector 61 is mounted at the top of the tube 59.

Figure 9:
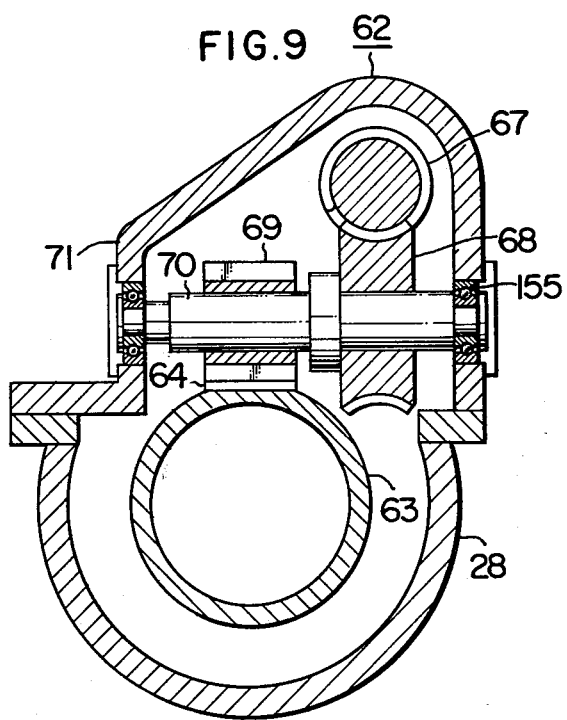
FIG. 9 is a sectional view taken along the line IX-IX in FIG. 6.

The attaching and detaching head support member 169 will now be described. The attaching and detaching head support member 169 includes a casing 28 having mounted thereon elevating means 62, upper support means 65 and lower support means 170. The elevational column 63 of the attaching and detaching head 168 extends through the casing 28. A linear bearing 73 is mounted in the upper portion between the casing 28 and elevational column 63, while another linear bearing 74 is mounted in the lower portion between the casing 28 and elevational column 63. A casing 71 is attached to the casing 28 and has the elevating means 62 mounted therein. The elevating means 62 comprises an air motor 66 supported on the casing 71, a worm 67 (See FIG. 9) in meshing engagement with a rotary shaft of the air motor 66, a worm wheel 68 in meshing engagement with the worm 67, a rotary shaft 70 journalled on the casing 71 through a radial bearing 155 for supporting the worm wheel 68, and a pinion 69 mounted on the rotary shaft 70 and in meshing engagement with a rack 64 on the elevational column 63.

The upper support means 65 comprises a support sleeve 76 enclosing the upper portion of the casing 28, and a thrust bearing 77 is interposed between the casing 28 and the support sleeve 76. The support sleeve 76 also has on its outer surface clips 172 which are received in openings 174 formed in a frame 173 of the carriage 21 as shown in FIGS. 3 and 4. At the lower end of the casing 28 is provided a sleeve 78 which is formed with gear teeth. Located below the sleeve 78 and outside of the casing 28 is a support sleeve 79 of the lower support means 170, and a radial bearing 80 is mounted between the support sleeve 79 and casing 28. As shown in FIGS. 3 and 4, clips 175 provided on the support sleeve 79 are received in cutouts 176 in the frame 173 of the carriage 21. The gear teeth of the sleeve 78 is in meshing engagement with a gear 82 connected to an air motor 81 secured to the carriage 21. The air motor 81, gear 82 and sleeve 78 constitute attaching and detaching head rotating means 171 which is secured to the carriage 21. By withdrawing the clips 172 and 175 from the frame 173, it is possible to readily remove the main body 26 of the attaching and detaching device 20, thereby facilitating maintenance and inspection of the main body 26.

Referring to FIG. 3 again, the carriage 21 has mounted on its lower portion a pair of air cylinders 178A and 178B having pistons inserted therein and piston rods 179A and 179B connected to the respective pistons. The piston rods 179A and 179B support at one thereof pulleys 180A and 180B, respectively. Fixed pulleys 181A and 181B are mounted on the carriage 21 (FIG. 4). Mounted in the lower portion of the elevational column 63 is a fixture 182 supporting pulleys 183A and 183B thereon. A wire 184 secured at one end thereof to a fixture member 185A projecting from the carriage 21 is trained over the pulleys 180A, 181A, 183A, 183B, 181B and 180B in the indicated order as shown in FIG. 3, and secured at the other end thereof to a fixture member 185B projecting from the carriage 21.

The CRD handling device 83 will now be described in detail by referring to FIGS. 10, 11 and 12. The CRD handling device 83 comprises a carriage 84, horizontally driving means 86, a column 91, CRD elevating means 94, means 107 for bringing the column to a horizontal position, and a cart 132. The carriage 84 has wheels 85 supported on the rails 18 of the revolving device 11. The horizontally driving means 86 includes a motor 87 having a shaft which is connected to speed reduction gearings 88 and 89 and which, although not shown, is connected, like the rotary shaft 165 of the CRD attaching and detaching device 20, to pinions which mesh with the racks 167 in the lower portion of the rails 18 of the revolving device 11. A support shaft 90 is secured to the carriage 84, and the column 91 extends through the carriage 84 and has secured thereto support plates 92 and 93 rotatably supported by the support shaft 90. Mounted in the column 91 and extending axially thereof are a pair of guide rails 130 and a pair of sideway movment preventing plates 131 located in spaced juxtaposed relation.

Figure 10:
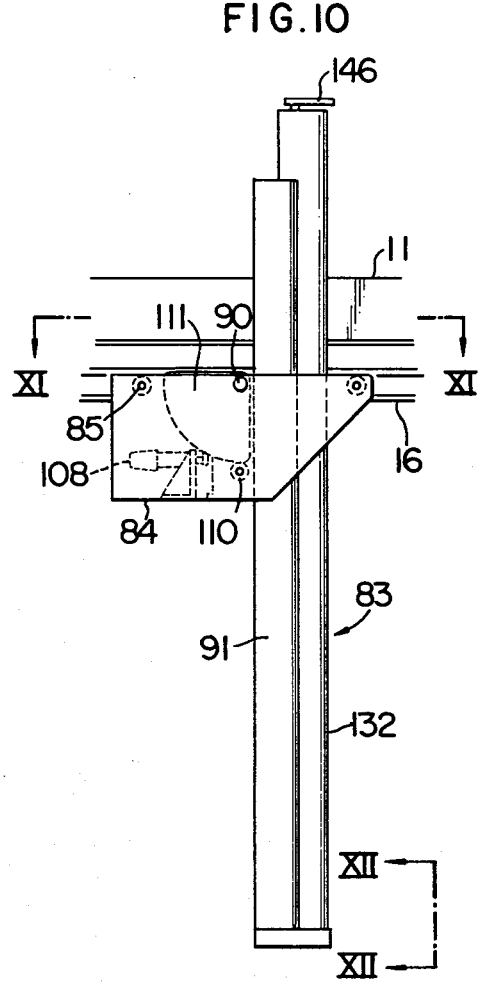
FIG. 10 is a side view of the CRD handling device shown in FIG. 1.
Figure 11:
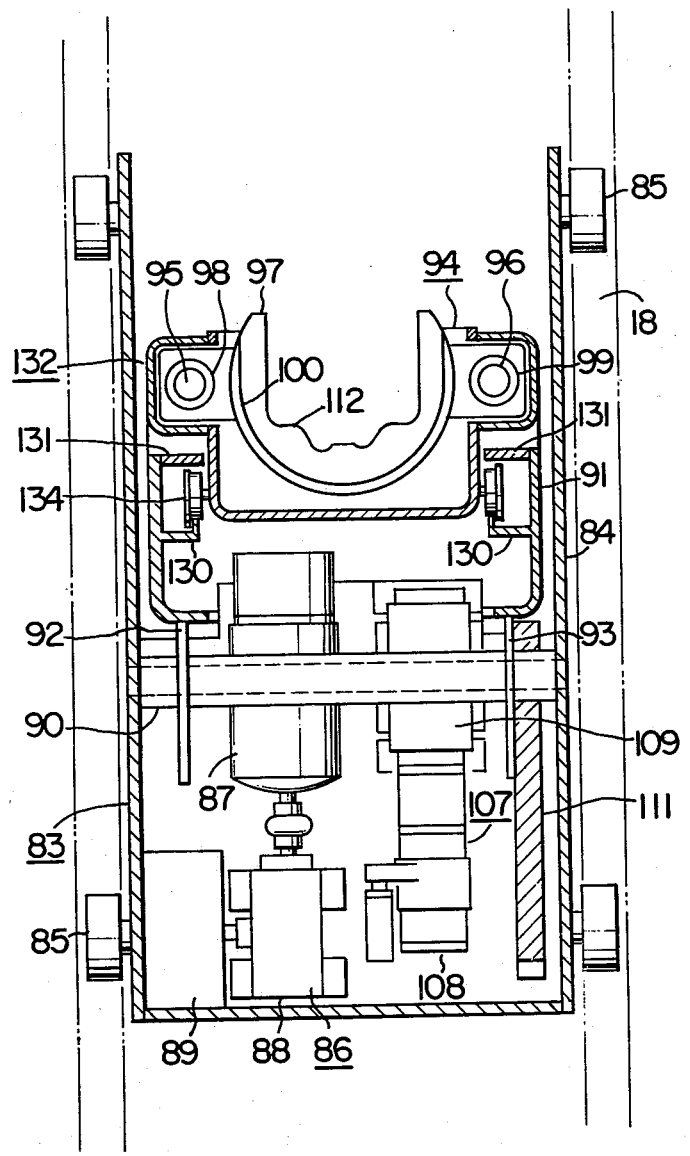
FIG. 11 is a sectional view taken along the line XI-XI in FIG. 10.

The means 107 for bringing the column to a horizontal position is mounted in the carriage 84 and includes an air motor 108 connected, through speed reduction gearing 109, to a pinion 110 in meshing engagement with a segmental gear 111 supported by the support plate 93 as shown in FIG. 10.

Figure 12:
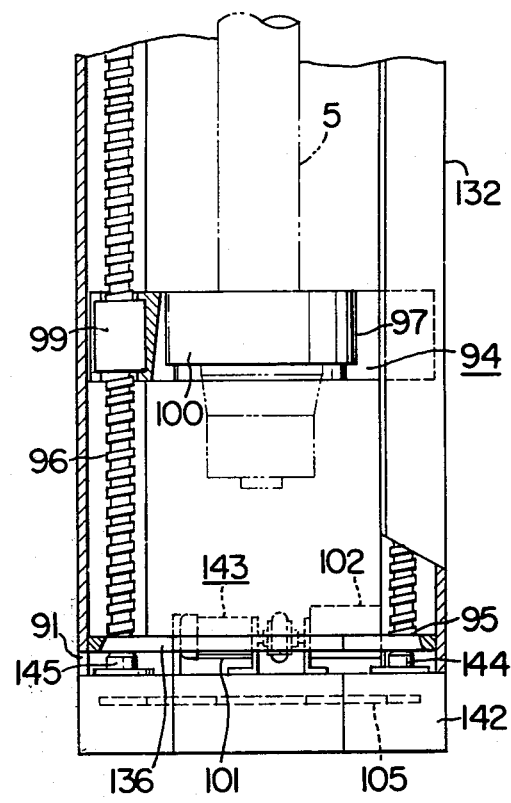
FIG. 12 is a view as seen in the direction of arrows XII-XII in FIG. 10.
Figure 17:
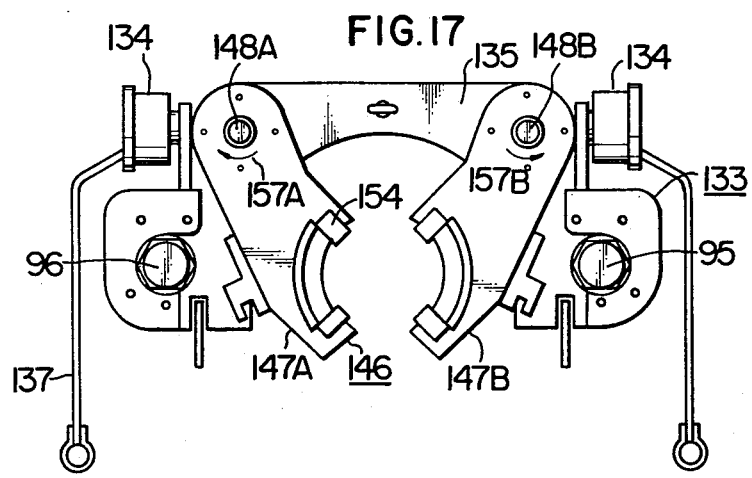
FIG. 17 is a view as seen in the direction of arrows XVII-XVII in FIG. 16.
Figure 18:
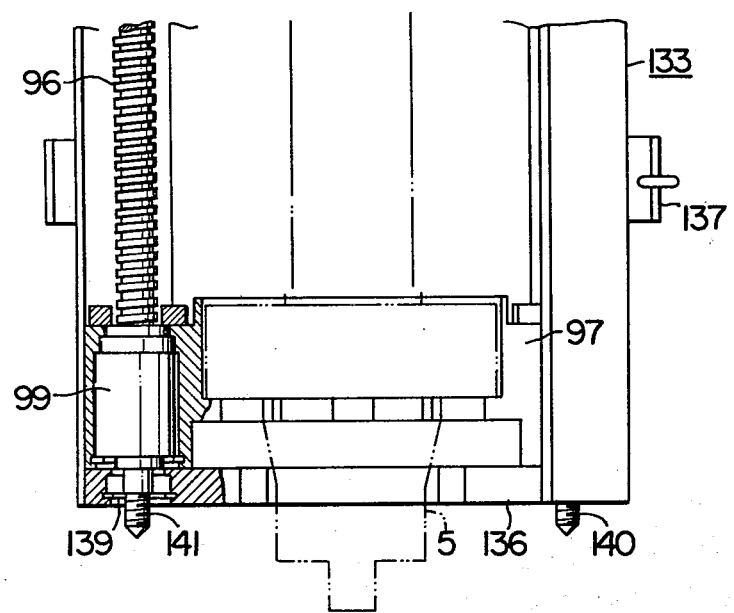
FIG. 18 is a view, on an enlarged scale, of the portion designated by XVIII in FIG. 13.

Vertical driving means 143 shown in FIG. 12 comprises an air motor 101 mounted on a bottom plate 142 of the column 91, speed reduction gearing 102, and wrenches 144 and 145. The air motor 101 is connected, through the speed reduction gearing 102 and a gear train 105, to the wrenches 144 and 145 each formed therein with a hole of the hexagonal cross sectional shape.

Although not shown, the carriage 84 of the CRD handling device 83 includes, like the carriage 21 of the CRD attaching and detaching device 20, two portions, one supporting the wheels 85 and the other being detachably mounted on the above one portion and mounting therein the horizontally driving means 86, column 91 and means 107 for bringing the column to a horizontal position.

The construction of the cart 132 will be described in detail by referring to FIGS. 13 to 18. The cart 132 comprises the CRD elevating means 94, a cart body 133 and a CRD gripping mechanism 146. The cart body 133 has a plurality of wheels 134 arranged axially thereof, and end plates 135 and 136 connected to opposite ends thereof. Two pairs of hanging fixtures 137 are attached to the outer wall surface of the cart body 133.

The CRD elevating means 94 comprises ball screws 95 and 96, a lifter 87, and ball nuts 98 and 99. The ball screws 95 and 96 are rotatably journalled at opposite ends thereof by the end plates 135 and 136 of the cart body 133 through a pair of radial and thrust bearings 138 and 139. The ball nuts 98 and 99 supported by the lifter 97 are in meshing engagement with the ball screws 95 and 96 respectively. The lifter 97 is formed with a recess 100 for receiving the CRD 5, and with a cutout 112. Fitting portions 140 and 141 are connected to the lower ends of the ball screws 95 and 96, respectively and have a hexagonal shape in cross section. The fitting portions 140 and 141 are fitted in the wrenches 144 and 145, respectively, of the vertical driving means 143 supported on the bottom plate 142 of the column 91 as shown in FIG. 12.

The CRD gripping mechanism 146 is mounted on the end plate 135 of the cart body 133. The construction of the CRD gripping mechanism 146 will be described in detail by referring to FIGS. 16 and 17. The CRD gripping mechanism 146 comprises a pair of grapples 147A and 147B, a pair of rotary shafts 148A and 148B, and a pair of slide plates 150A and 150B. The rotary shafts 148A and 148B are supported by the end plate 135 of the cart body 133 through a pair of radial and thrust bearings 151, and have at one end portion thereof twisted portions 149A and 149B respectively of the square shape in cross section. The grapples 147A and 147B are mounted on the rotary shafts 148A and 148B respectively and located outside the end plate 135. Guide rods 152A and 152B are connected to the end plate 135 and extend through the cart body 133 to support the slide plates 150A and 150B respectively for sliding movement. The slide plates 150A and 150B are formed with openings of the square shape for permitting the twisted portions 149A and 149B of the rotary shafts 148A and 148B respectively to be inserted therein. A coil spring 153A is mounted on the rotary shaft 148A between the end plate 135 and the slide plate 150A, while another coil spring 153B is mounted on the rotary shaft 148B between the end plate 135 and the slide plate 150B. The grapples 147A and 147B each has a pair of claws 154 at the forward end.

The replacing of the CRD 5 according to replacing apparatus 10 will now be described under assumption that the CRD 5 is removed from the CRD housing 3. The motor 12 is actuated to move the revolving device 11 on the annular rail 8. Further, the motor 24 is actuated to move the carriage 21 horizontally along the rails 17, so as to bring the main body 26 of the CRD attaching and detaching device 20 to a position below the CRD 5 to be detached from the CRD housing 3. At this time, the CRD attaching and detaching device 20 is located in a position A shown in FIG. 1 and the CRD handling device 83 is located near the inner wall surface of the pedestal 2. Then the air motor 66 mounted on the main body 26 of the CRD attaching and detaching device 20 is actuated to rotate the pinion 69. Rotation of the pinion 69 causes the elevational column 63 to move upwardly through the rack 64 meshing with the pinion 69, thereby moving the attaching and detaching head 168 upwardly. The air motor 66 of the elevating means 62 is de-actuated immediately before the upper ends of the bolt wrenches 39 are brought into engagement with the CRD connecting bolts 114, thereby interrupting the upward movement of the elevational column 63. Thereafter, the air motor 81 is actuated to rotate the casing 28 to which the sleeve 78 is attached. The attaching and detaching head 168 rotates simultaneously with the casing 28, to thereby position the bolt wrenches 39 of the connecting bolt handling means 33 relative to the CRD connecting bolts 114. Positioning of the bolt wrenches 39 relative to the CRD connecting bolts 114 can be readily effected by the attaching and detaching head rotating means 171. After the bolt wrenches 39 are properly positioned relative to the CRD connecting bolts 114, the air motor 66 is actuated again to move the elevational column 63 further upwardly. The air motor 66 is deactuated when a tapering portion 159 of the CRD 5 is brought into contact with a tapering opening in a seat 157 at the upper end of the bolt housing 41, so that the upward movement of the elevational column 63 is interrupted. At this time, the bolt wrenches 39 engage the heads of the respective CRD connecting bolts 114.

The upper end of the adapter 58 is brought into contact with the underside of the CRD 5, and the lower end of the piston tube 158 of the CRD 5 is inserted in the opening 123 in the adapter 58.

Before detaching the CRD 5, it is necessary to uncouple the CRD from a control rod, not shown. As shown in FIG. 7 of the aforementioned U.S. Ser. No. 778,168, the control rod is connected to the upper end of the CRD 5 in the pressure vessel 1 of the nuclear reactor. The operation of uncoupling the CRD 5 from the control rod is performed as follows. Compressed air is introduced through the conduit 52 and passage 51 into the space 55 to move the piston 56 upwardly. This brings the adapter 58 into contact with the piston tube 158 of the CRD 5, and the piston tube 158 is moved upwardly. An uncoupling rod, not shown, is provided at the upper end of the piston tube 158. Upward movement of the uncoupling rod releases a spud, not shown, of the CRD 5 from mechanical engagement with a socket, not shown, of the control rod. The CRD 5 is operated to move an index tube, not shown, therein downwardly, so that the spud at the upper end of the index tube is released from the control rod, thereby completely separating the CRD 5 from the control rod.

Compressed air is introduced into a space 104 defined by the cylinder 48, plug 50, tube 59 and piston portion 60 through the conduit 54 and passage 63. This moves the piston portion 60 upwardly in the piston 56, so that the detector 61 is inserted into the piston tube of the CRD 5. If the index tube has moved downwardly to a predetermined position, the presence of the index tube is detected by the detector 61 by the operation described in aforementioned U.S. Ser. No. 778,168. Thus, uncoupling of the CRD 5 from the associated control rod can be detected. With the adapter 58 being in contact with the underside of the CRD 5, the positioning of the attaching and detaching head 168 in the vertical direction can be effected with an increased degree of precision and uncoupling of the CRD 5 from the control rod can be detected reliably. If the adapter 58 is not in contact with the underside of the CRD 5, and if the CRD 5 is merely in contact at its tapering portion with the bolt housing 41 as shown in FIG. 3 of aforementioned U.S. Ser. No. 778,168, the position of the attaching and detaching head 168 in the vertical direction will vary from one CRD 5 to another. As a result, a limit switch, not shown, of the detector 61 and a magnet in the index tube of the CRD 5 might not coincide in position. Thus, there is the possibility that it is impossible to ascertain or detect whether or not the CRD 5 is uncoupled from the control rod.

Following uncoupling of the CRD 5 from the control rod, compressed air is introduced into the air cylinder 118 to move the piston 119 upwardly. Since the piston rod 117 moves upwardly, the inner drain sleeve 115 also moves upwardly. The presence of the ledge 121 in the inner drain sleeve 115 moves the seal ring 49 and the outer drain sleeve 116 upwardly. By and by, the inner and outer drain sleeves 115 and 116 surround the outer circumferential surface of a flange of the CRD housing 3, and the upward movement of the outer drain sleeve 116 is interrupted when the lower end thereof abuts against an offset portion of the bolt housing 41. The inner drain sleeve 115 further moves upwardly, and the seal ring 49 between the two ledges 121 and 122 is compressed and forced tightly against the outer circumferential surface of the flange of the CRD housing 3. In this way, a seal is effectively provided between the flange of the CRD housing 3 and the drain sleeve 45.

Air is supplied through conduits 75 to eight air motors 35 of the connecting bolt handling means 33 to actuate them simultaneously. Rotation of the air motors 35 is transmitted, through the speed reduction gearings 34 and rotary shafts 36 and 37 to the bolt wrenches 39 to rotate them. When the CRD connecting bolts 114 are loosened, the bolt wrenches 39 are moved downwardly into the spaces 38 in the rotary shafts 37 while compressing the coil springs 40. Eight CRD connecting bolts 114 are all loosened, and each CRD connecting bolt 114 is withdrawn from the CRD housing 3 and its head is inserted in one of the bolt holders 42 which is aligned therewith, so that the CRD 5 is disconnected from the CRD housing 3. Withdrawing of the CRD connecting bolts 114 from the CRD housing 3 is ascertained by the vibrometer 160. Then the air motor 66 is actuated again to move the elevational column 63 slightly downwardly. As a result, coolant in the CRD housing 3 flows out through the gap between the CRD housing 3 and CRD 5, and the angling ducts 34 and 156 in the bolt housing 41, into the space 72. The drain sleeve 45 performs the function of preventing the coolant from scattering to the surrounding area. The coolant is discharged through the drains 120 to the bottom of the space 6. It is to be noted that the coolant of high radioactivity level is prevented from splashing in the wroking atmosphere in the space 6. It is also to be noted that the provision of the drains 120 in the attaching and detaching head 168 makes it possible to move the CRD attaching and detaching device 20 more readily than the arrangement in which drain tubes are provided as shown in FIG. 6 of aforementioned U.S. Ser. No. 778,168. More specifically, when the CRD attaching and detaching device 20 is moved in the space 6 into which a number of neutron flux measuring instrument housings 4 extend and which is full of cables, not shown, connected to the neutron flux measuring instruments in the housings 4 and to the CRDs 5 in the housings 3, the presence of drain tubes outside the main body 26 of the device 20 offers the possibility that the movement of the device 20 is impeded. Also, since the spacing between the CRDs 5 is small, there is the possibility that the operation of moving the attaching and detaching head 168 upwardly as aforesaid is interfered with by the presence of the drain tubes outside the main body 26 of the device 20.

Upon completion of uncoupling of the CRD 5 from the control rod, the underside of the control rod comes into contact with the upper end of the CRD housing 3, thereby providing a seal to the pressure vessel 1 to avoid the outflow of coolant from the pressure vessel 1 into the CRD housing 3. When draining of the coolant from the CRD housing 3 is completed, the piston 119 is actuated to move the drain sleeve 45 downwardly. Then the compressed air in the spaces 55 and 104 is released to move the piston 56 and tube 59 downwardly to their original positions. The air motor 66 of the elevating means 62 is actuated again to move the elevational column 63 downwardly. The CRD 5 is withdrawn from the CRD housing 3 in the condition that the former rests on the upper end of the bolt housing 41.

While the elevational column 63 is being moved downwardly, compressed air is supplied to the cylinders 178A and 178B (FIG. 3). This moves the piston rods 179A and 179B downwardly to permit the elevational column 63 to be moved upwardly by the wire 184 to the degree that the load of the CRD 5 and attaching and detaching head 168 is not applied to the pinion 69. Thus the movement of the elevational column 63 is smoothly effected.

Figure 19:
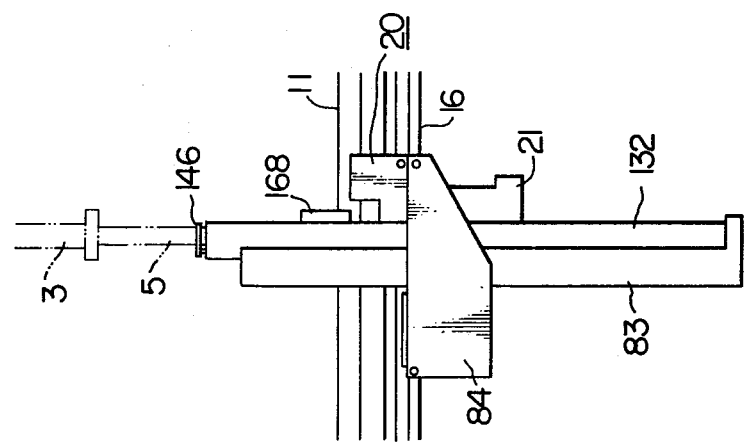
FIG. 19 is an explanative view showing how the CRD attaching and detaching device is brought into engagement with the CRD handling device.

When the CRD 5 is withdrawn substantially half of it from the CRD housing 3, the downward movement of the elevational column 63 is interrupted. Then the motor 87 is actuated to move the CRD handling device 83, which is located near the end of the rails 18, along the rails 18 to a position shown in FIG. 19 in which the CRD handling device 83 is in engagement with the CRD attaching and detaching device 20. In this position, the column 91 of the handling device 83 is in a vertical position. The lifter 97 is positioned in the upper end portion of the colunn 91 before the handling device 83 is brought into engagement with the attaching and detaching device 20.

Upward movement of the lifter 97 is effected as follows. Rotation of the air motor 101 of the vertically driving means 143 is transmitted, through the speed reducing gearing 102 and gear train 105, to the wrenches 144 and 145 and then to the ball screws 95 and 96 through the fitting portions 140 and 141 respectively. Actuation of the ball nuts 98 and 99 by the rotation of the ball screws 95 and 96 respectively moves the lifter 97 upwardly. The upward movement of the lifter pushes the slide plates 150A and 150B to move along the guide rods 152A and 152B, respectively. As the twisted portions 149A and 149B move through the square openings in the slide plates 150A and 150B respectively, the rotary shafts 148A and 148B rotate in the directions of arrows 157A and 157B respectively in FIG. 17. Rotation of the rotary shafts 148A and 148B cause the grapples 147A and 147B to rotate in the same direction as the associated rotary shaft, so that the grapples 147A and 147B are brought to an open position. Thus, the grapples 147A and 147B are automatically brought to an open position by the upward movement of the lifter 97. When the grapples 147A and 147B are brought to an open position, the rotary shafts 148A and 148B are prevented from moving axially upwardly thereof and extending further upwardly above the end plate 135.

Figure 20:
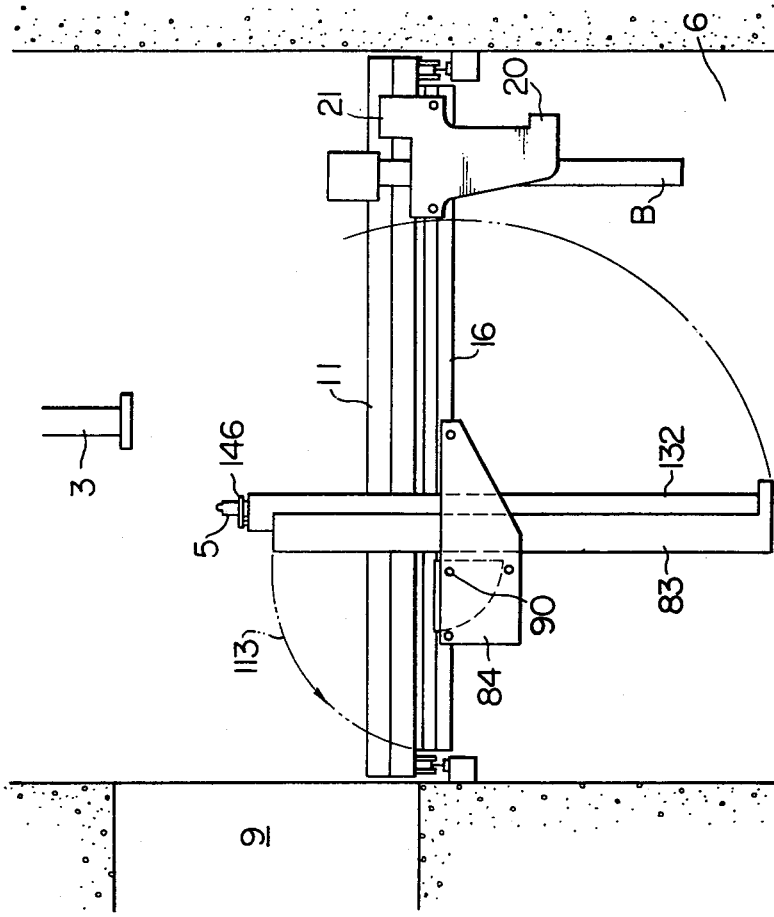
FIG. 20 is an explanative view showing the manner in which the column of the CRD handling device is moved to a horizontal position.

The arrangement that the carriages 21 and 84 moves along rails 17 and 18, respectively, facilitates the engagement of the CRD handling device 83 with the CRD attaching and detaching device 20, i.e., positioning of the center of the recess 100 of the lifter 97 on the center axis of the main body 26 of the attaching and detaching device 20. When the CRD handling device 83 is brought into engagement with the CRD attaching and detaching device 20, the lower end of the CRD 5 is inserted in the cutout 112 in the lifter 97 and the CRD 5 is fitted between the grapples 147A and 147B in the open position. Then the air motor 66 is actuated to move the elevation column 63 and thus the attaching and detaching head 168 downwardly so as to transfer the CRD 5 from the bolt housing 41 of the CRD attaching and detaching device 20 to the lifter 97 of the CRD handling device 83. At this time, the flange at the lower end of the CRD 5 is placed in the recess 100 in the lifter 97. When the bolt housing 41 of the attaching and detaching head 168 is moved to the lowest position in its range of movement by the air motor 66 or when the flange of the elevational column 63 comes into contact with the upper end of the housing 28, the CRD attaching and detaching device 20 is moved along the rails 17 to a point B in FIG. 20. Then the air motor 101 is actuated again to rotate the ball screws 95 and 96, to thereby move the lifter 97 downwardly. Upon the lifter 97 being released from engagement with the slide plates 150A and 150B, the latter are automatically moved downwardly by the biasing forces of coil springs 153A and 153B, respectively. As a result, the rotary shafts 148A and 148B rotate in directions opposite to the directions indicated by the arrows 157A and 157B, respectively, thereby bringing the grapples 147A and 147B to a closed position to grip the CRD 5. In this way, the grapples 147A and 147B are positively brought to open and closed positions when the lifter 97 is moved upwardly and downwardly, and no special control device is required for opening and closing the grapples 147A and 147B.

With the grapples 147A and 147B in the closed position, the CRD 5 on the lifter 97 is prevented from falling down even if the CRD 5 is fully withdrawn from the CRD housing 3. When the lifter 97 is moved to its lowermost position, withdrawing of the CRD 5 from the CRD housing 3 is completed.

Then the revolving device 11 and carriage 84 are moved to move the CRD handling device 83 to a position suitable for bring the column 91 to a horizontal position. When the column 91 reaches such position, the air motor 108 of the means 107 for bringing the column to a horizontal position is actuated, and rotation of the air motor 108 is transmitted, through the speed reduction gearing 109 and pinion 110, to the segmental gear 111 to rotate the gear 111 about the center of the support shaft 90, thereby moving the column 91 sideways in the direction of an arrow 113 in FIG. 20. By this operation, the center axis of the CRD 5 on the CRD handling device 83 is directed to extend horizontally and the top of the CRD 5 is oriented toward the opening 9.

Then the cart 132 is withdrawn from the CRD handling device 83. The cart 132 is removably mounted on the column 91 of the CRD handling device 83 in such a manner that the fitting portions 140 and 141 are fitted in the wrenches 144 and 145 respectively and wheels 134 are each inserted between a guide rail 130 and a sideway movement preventing plate 131. Therefore, if the cart 132 is pulled toward the opening 9 when the center axis of the CRD 5 is directed to the horizontal, the cart 132 can be readily withdrawn from the CRD handling device 83.

As shown in FIG. 1 of U.S. Ser. No. 778,168, the cart 132 supporting the CRD 5 thereon is moved on the bridge connecting the opening 9 with the CRD delivery opening of a containment vessel, to thereby move the cart 132 out of the containment vessel. Thus maintenance and inspection of the CRD 5 are carried out outside the containment vessel.

As aforesaid, the cart 132 carrying the CRD 5 is removed from the column 91 of the CRD handling device 83 and moved out of the space 6 through the opening 9. By this arrangement, reloading of the CRD 5 which has hitherto been effected between the cart and the CRD handling device can be eliminated. This eliminates the risk, which will otherwise be exposed to the operator, of being exposed to radiation while reloading the CRD 5, and at the same time markedly reduces time required for performing the replacing of the CRD. Also, the arrangement that the vertical driving means 143 for driving the CRD elevating means 94 mounted on the cart 132 is mounted on the column 91 of the CRD handling device 83 facilitates the movement of the cart 132 after the latter has been removed from the column 91. If the vertical elevating means 143 is mounted on the cart 132, it would be necessary to gradually pull out or lengthen the hose connected to the air motor 101 of the vertical driving means 143 for supplying compressed air, when the cart 132 is moved through the opening 9 to the outside of the containment vessel. In this case, difficulties will be encountered in freely moving the cart 132 and handling the hose which has a large length.

The CRD 5 which has been checked or a new CRD 5 is inserted in the CRD housing 3 following the steps which are reversed in order from the steps described hereinabove. More specifically, the cart 132 carrying the CRD 5 is mounted on the column 91 of the CRD handling device 83, and then the column 91 is moved or rotated to a vertical position. The operation of reloading the CRD 5 from the cart 132 to the CRD handling device 83 is eliminated as is the case when the cart 132 is moved out of the space 6 through the opening 9. Then the CRD handling device 93 is moved to a position in which the CRD 5 is disposed immediately below the predetermined CRD housing 3, and the CRD 5 is transferred to the main body 26 of the CRD attaching and detaching device 20 which has been moved to the same position as the CRD handling device 83. Then the CRD 5 is attached to the CRD housing 3 by the main body 26 of the CRD attaching and detaching device 20.

The cart 132 of the above-discussed embodiment has dual functions; i.e., when it is mounted on the column 91 of the CRD handling device 83, it functions as part of the CRD handling device 83; and when it is removed from the column 91, it functions to move the CRD 5 between the space 6 and the outside of the containment vessel. This arrangement offers the advantage that, since reloading of the CRD 5 between the CRD attaching and detaching device 20 and CRD handling device 83 is performed only once and reloading of the CRD 5 is automatically carried out by the respective devices, the risk imposed to the operator of being exposed to radiation is greatly reduced and the time required for carrying out the CRD replacing is markedly reduced.

Also, in the embodiment shown and described hereinabove, the CRD attaching and detaching device 20 and CRD handling device 83 are mounted independently of each other on the revolving device 11 so that the devices 20 and 83 may be operated separately on the revolving device 11. This arrangement enables the length of the column of the CRD handling device to be reduced by one-fifth, as compared with the length of the column of the prior art which supports thereon the CRD attaching and detaching device and CRD gripping mechanism. This is conducive to reduced size of the CRD replacing apparatus 10, with a result that the distance between the bottom of the space 6 and the lower end of the CRD 5 attached to the CRD housing 3 can be reduced and the diameter of the space 6 can be reduced. A reduction in the dimensions of the space 6 improves the ability of the nuclear reactor to withstand the shock of an earthquake and makes it possible to reduce the volume of the containment vessel. The CRD attaching and detaching device 20 and CRD handling device 83 can be readily moved out of the pedestal 2 for maintenance and inspection.

Figure 21:
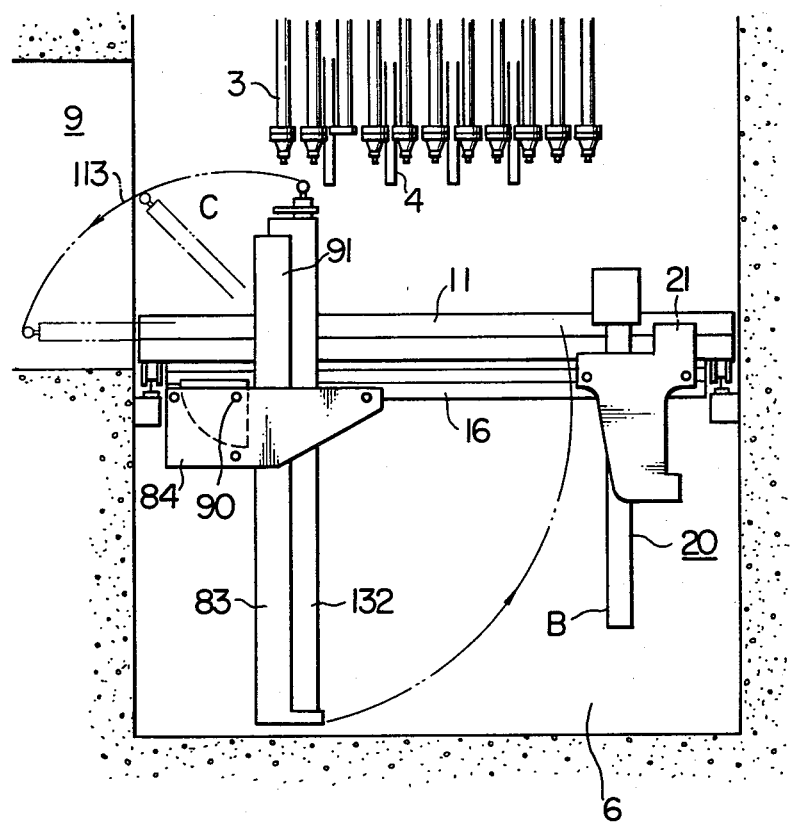
FIG. 21 is an explanative view showing a modification of the manner in which the column of the CRD handling device is moved to a horizontal position.

Another method of moving the column 91 of the CRD handling device 83 to a horizontal position will be described by referring to FIG. 21. When the column 91 is moved to a horizontal position, the revolving device 11 is moved along the annular rail 8 so as to direct the guide slot 14 toward the opening 9. The carriage 84 of the CRD handling device 83 is moved to a predetermined position in which the column 91 is moved to a horizontal position. Thereafter, the means 107 for moving the column to a horizontal position is actuated to move the column 91 sideways in the direction of the arrow 113. When the column 91 is brought to a horizontal position, the top of the CRD 5 supported on the cart 132 is inserted into the opening 9. With the structure that the column 91 is brought to a horizontal position in a manner to insert the top of the CRD 5 into the opening 9, it is possible to install the CRD replacing apparatus 10 in a space 6 of a smaller diameter than that of the aforesaid embodiment.

Figure 22:
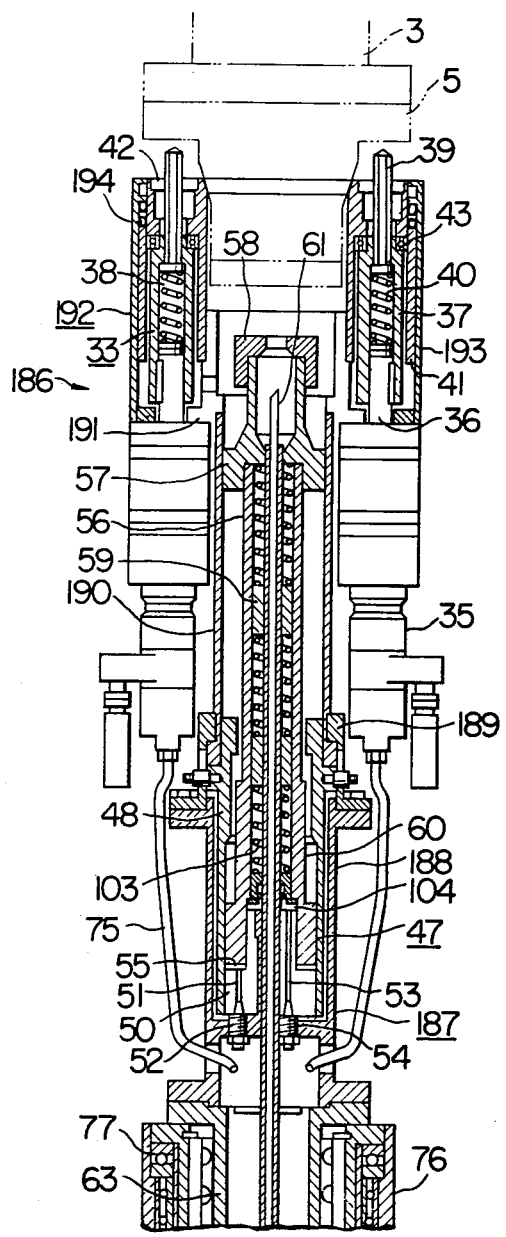
FIG. 22 is a vertical sectional view of the upper portion of a main body of a modified CRD attaching and detaching device.

FIG. 22 shows a modification of the attaching and detaching head, in which parts similar to those of the attaching and detaching head 168 described hereinabove are designated by like reference characters. Those parts of the attaching and detaching head 186 which differ from parts of the head 168 will now be described in detail. In the attaching and detaching head 186, the connecting bolt handling means 33 for fastening and unfastening the CRD connecting bolts 114 to and from the CRD housing 3 and coolant splash preventing means 192 for recovering coolant flowing from the CRD housing 3 are provided at an upper part of a housing 187 which houses uncoupling means 47 for uncoupling the CRD 5 from a control rod, not shown, connected to the upper end of the CRD 5. The housing 187 includes a plurality of housing segments as presently to be described. A lowermost housing segment 188 is mounted on a flange of the elevational column 63. Housing segments 189, 190 and 191 are successively upwardly arranged above the housing segment 188. The housing segments 188, 189, 190 and 191 are secured together, with the housing segment 191 being the uppermost housing segment.

The eight air motors 35 of the connecting bolt handling means 33 are mounted on a flange of the uppermost housing segment 191 and arranged substantially equidistantly around the housing segment 190.

The coolant splash preventing means 192 comprises a drain sleeve 193, a piston rod, an air cylinder, drains and a coolant discharge pipe, all not shown. The cylindrical drain sleeve 193 is located around the bolt housing 41 in enclosing relation. A packing 194 is mounted between the bolt housing 41 and the drain sleeve 193. The piston rod connected to the drain sleeve 193 is inserted in the air cylinder.

The attaching and detaching head 186 is substantially similar to the attaching and detaching head 168 described, except that in the former the coolant discharge pipe is used for draining purposes and that the drain sleeve 193 is in the form of a cylinder. Without this exception, the head 186 can achieve the same effects as the head 168.

Figure 24:
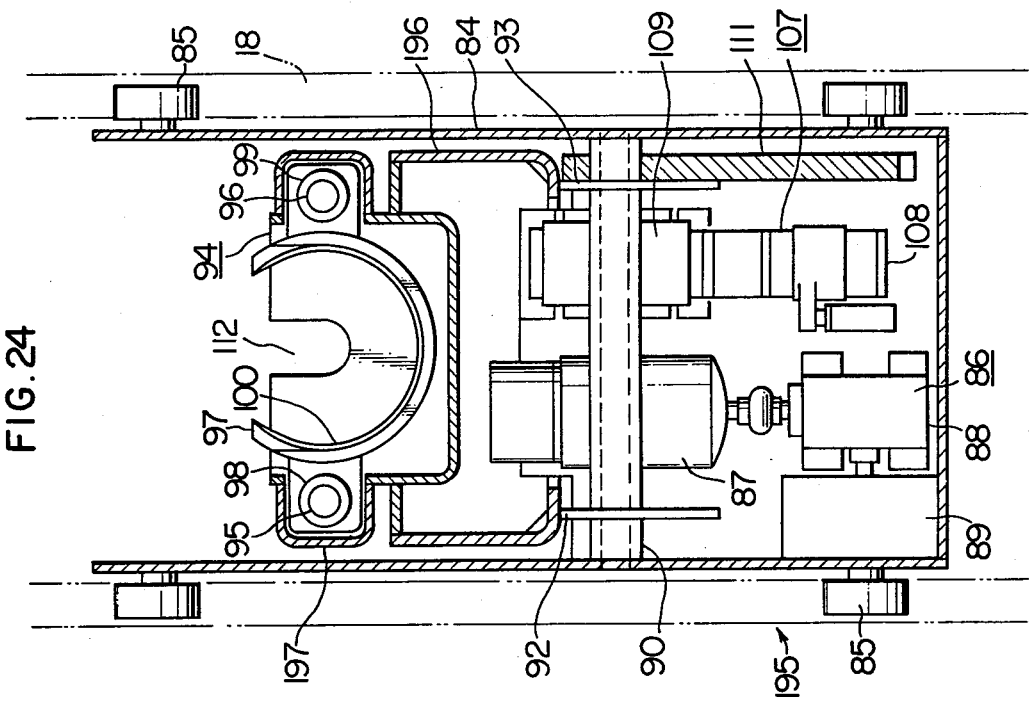
FIG. 24 is a sectional view taken along the line XXIV-XXIV in FIG. 23.
Figure 23:
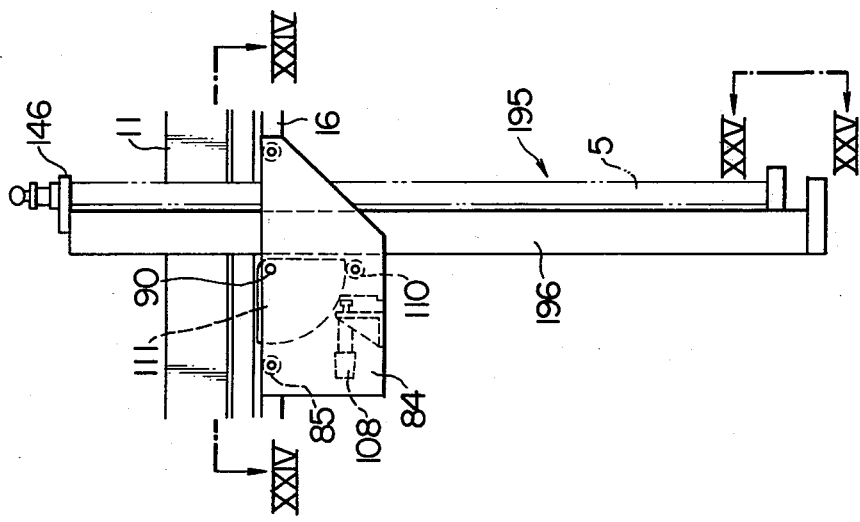
FIG. 23 is a side view of a modification of the CRD handling device.
Figure 25:
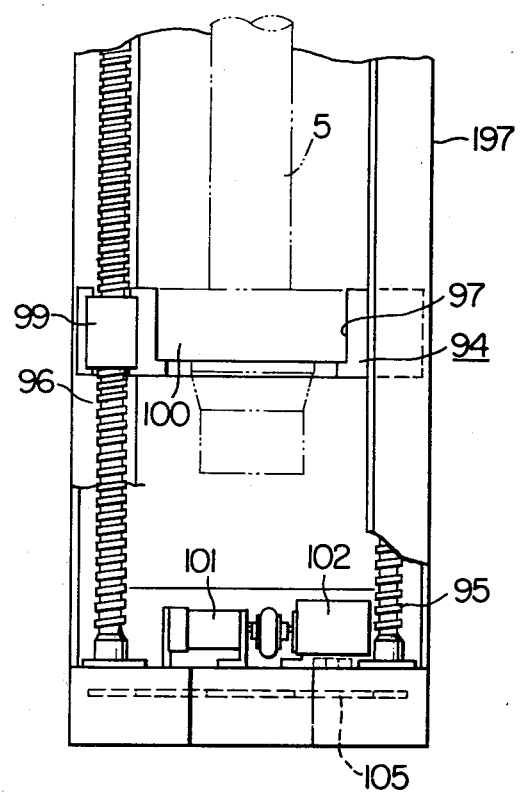
FIG. 25 is a view as seen in the direction of arrows XXV-XXV in FIG. 23.

FIGS. 23, 24 and 25 show a modification of the CRD handling device. Parts similar to those of the CRD handling device 83 are designated by like reference characters, and only those parts which differ from the parts of the device 83 will be described. The CRD handling device 195 is distinct from the CRD handling device 83 in that the CRD elevating means 94 and CRD gripping mechanism 146 are mounted on the column 196. The cart cannot be mounted on the CRD handling device 195.

The CRD handling device 195 comprises the carriage 84, horizontally driving means 86, column 196, CRD elevating means 198, CRD gripping mechanism 146 and means 107 for moving the column to a horizontal position. The carriage 84 has secured thereto the support shaft 90, and the column 91 extends through the carriage 84. The support plates 92 and 93 secured to the column 91 are rotatably supported by the support shaft 90. The CRD elevating means 94 is mounted on a guide 197 on the column 91. The ball screws 95 and 96 are mounted in the guide 197 and extend longitudinally of the column 91. On the lifter 97 are mounted ball nuts 98 and 99 which are in engagement with the ball screws 95 and 96 respectively. The recess 100 for receiving the CRD is formed in the lifter 97. The guide 197 has the air motor 101 and speed reduction gearing 102 mounted on its bottom. The air motor 101 is connected to the ball screws 95 and 96 through the speed reduction gearing 102 and gear train 105. The CRD gripping mechanism 146 is mounted on the upper portion of the column 91.

In the CRD handling device 195, it is ncessary to reload the CRD 5 from the cart to the CRD handling device and vice versa when the CRD 5 is delivered from outside into the space 6 and from the space 6 to outside. However, since the CRD attaching and detaching device and the CRD handling device 195 are not unitary, the length of the column 196 of the CRD handling device 195 can, like the column 91 of the CRD handling device 83, be reduced as compared with the length of a column of the prior art. That is, in a CRD replacing apparatus comprising a CRD attaching and detaching device including the attaching and detaching head 186 and the CRD handling device 195, it is possible to reduce the length of the column, thereby making it possible to obtain a compact overall size in a CRD replacing apparatus and to reduce the volume of the space 6.

This invention offers the advantage of obtaining compact CRD replacing apparatus including reduced length of the column, which can reduce the size of the space for installing the CRD replacing apparatus.

What is claimed is:

1. A method of replacing a control rod drive comprising the steps of:
   detaching said control rod drive from a pressure vessel disposed in a containment vessel of a nuclear reactor by means of a control rod drive attaching and detaching device capable of moving on a revolving device;
   moving a control rod drive handling device into contact with said control rod drive attaching and detaching device, said control rod drive handling device being capable of moving on said revolving device separately from and independently of said control rod drive attaching and detaching device;
   transferring said control rod drive from said control rod drive attaching and detaching device to said control rod drive handling device; and
   bringing said control rod drive, held in a vertical position in said control rod drive handling device, into a horizontal position by means of said control rod drive handling device, after said control rod drive handling device is released from said control rod drive attaching and detaching device.

2. A method of replacing a control rod drive as set forth in claim 1, wherein said control rod drive is brought to a horizontal position while causing insertion of the top of said control rod drive held in said control rod drive handling device into an opening for moving said control rod drive out of a space in which said revolving device, said control rod drive attaching and detaching device and said control rod drive handling device are disposed.

3. A method of replacing a control rod drive as set forth in claim 1 or 2, wherein said control rod drive is transferred from said control rod drive attaching and detaching device to control rod drive conveying means removably mounted on said control rod drive handling device and functioning as part of said control rod drive handling device, said control rod drive is moved sideways together with said control rod drive conveying means by the operation of said control rod drive handling device, and said control rod drive conveying means is removed from said control rod drive handling device.

4. An apparatus for replacing a control rod drive, the apparatus comprising:
   a revolving device;
   a control rod drive attaching and detaching device operable to detach the control rod drive from a pressure vessel of a nuclear reactor and to attach the same to said pressure vessel, said control rod drive attaching and detaching device including a first carriage movable on said revolving device; and
   a control rod drive handling device separate from and independent of the control rod attaching and detaching device for receiving said control rod drive from said control rod drive attaching and detaching device, for passing a control rod drive to said control rod drive attaching and detaching device, and for moving said control rod drive from a substantially vertical position to a substantially horizontal position or vice versa, said control rod drive handling device including a second carriage movable on said revolving device.

5. An apparatus for replacing a control rod drive as set forth in claim 4, wherein said control rod drive attaching and detaching device comprises said first carriage, an attaching and detaching head, and first elevating means mounted on said first carriage for moving said attaching and detaching head vertically, said attaching and detaching head including a housing mounted on said first carriage, means mounted on said housing for attaching and detaching detachable fastening means for attaching said control rod drive to the pressure vessel, uncoupling means in said housing for uncoupling said control rod drive from a control rod connected thereto in said pressure vessel, and coolant splash preventing means surrounding said means for attaching and detaching said fastening means, and said control rod drive handling device comprises said second carriage, a column pivotally mounted on said second carriage, second elevating means supporting said control rod drive and moving the same along said column, control rod drive gripping means mounted on said column, and means mounted on said second carriage for moving said column to a horizontal position.

6. An apparatus for replacing a control rod drive as set forth in claim 5, wherein said control rod drive gripping means is moved between an open position and a closed position by the operation of said second elevating means.

7. An apparatus for replacing a control rod drive, the apparatus comprising:
   a control rod device;

a control rod drive attaching and detaching device movable on said revolving device and operable to detach the control rod drive from a pressure vessel of a nuclear reactor and to attach the same to said pressure vessel;

a control rod drive handling device movable on said revolving device separately from said control rod drive attaching and detaching device, said control rod drive handling device being operable to transfer said control rod drive between said control rod drive attaching and detaching device and said control rod drive handling device, and to bring said control rod drive held by said control rod drive handling device into a laterally turned position and a raised up position; and control rod drive conveying means removably mounted on said control rod drive handling device, said control rod drive conveying means forming a part of said control rod drive handling device when mounted thereon and conveying said control rod drive to a predetermined position when removed from said control rod drive handling device.

8. An apparatus for replacing a control rod drive as set forth in claim 7, wherein said revolving device comprises first linear rails for said first carriage to move thereon, and second linear rails for said second carriage to move thereon, said first linear rails and said second linear rails being parallel to each other with respect to the perpendicular.

9. An apparatus for replacing a control rod drive as set forth in claim 7, wherein said control rod drive handling device comprises a first carriage movable on said revolving device, a column rotatably mounted on said first carriage, and said control rod drive conveying means is removably mounted on said column and transfer said control rod drive between said control rod drive attaching and detaching device and said control rod drive conveying means removably mounted on said column and transferring said control rod drive between said control drive attaching and detaching device and said control rod drive conveying means.

10. An apparatus for replacing a control rod drive as set forth in claim 9, wherein said revolving device includes first linear rails for said control rod drive attaching and detaching device to move thereon, and second linear rails for said control rod drive handling device to move thereon, said first linear rails and said second linear rails being parallel to each other with respct to a perpendicular.

11. An apparatus for replacing a control rod drive as set forth in claim 9, wherein said control rod drive attaching and detaching device comprises a second carriage movable on said revolving device, an attaching and detaching head mounted on said second carriage for ascending and descending movements, and means mounted on said second carriage for moving said attaching and detaching head in ascending and descending directions, said attaching and detaching head comprising a housing mounted on said second carriage, means mounted on an upper part of said housing for attaching and detaching detachable fastening means for attaching said control rod drive to the pressure vessel, uncoupling means in said housing for releasing a coupling between said control rod drive and a control rod connected thereto in said pressure vessel, and means for preventing a splashing of coolant flowing out of the pressure vessel upon a detachment of the control rod drive.

12. An apparatus for replacing a control rod drive as set forth in claim 11, wherein said revolving device comprises first linear rails for said first carriage to move thereon, and second linear rails for said second carriage to move thereon, said first linear rails and said second linear rails being parallel to each other with respect to the perpendicular.

13. An apparatus for replacing a control rod drive as set forth in claim 11, further comprising coolant discharge passages formed in said attaching and detaching head of said control rod drive attaching and detaching device for permitting coolant to flow there-through as the coolant leaks from the pressure vessel when the control rod drive is detached therefrom.

14. An apparatus for replacing a control rod drive as set forth in claim 13, wherein said control rod conveying means comprises a cart on which said control rod drive is placed, control rod gripping means mounted on said cart for preventing dislodging of said control rod drive from said cart, and a control rod moving means for moving said control rod along said cart while the control rod drive is on said cart.

15. An apparatus for replacing a control rod drive as set forth in claim 14, wherein said control rod drive gripping means is moved between an open position and a closed position by the operation of said control rod drive moving means.

16. An apparatus for replacing a control rod drive as set forth in claim 14, further comprising coolant discharge passages formed in said attaching and detaching head of said control rod drive attaching and detaching device for permitting coolant to flow therethrough as the coolant leaks from the pressure vessel when the control rod drive is detached therefrom.

17. An apparatus for replacing a control rod drive as set forth in claim 14, further comprising detecting means mounted in said attaching and detaching head of said control rod drive attaching and detaching device for detecting that said fastening means for attaching said control rod drive to the pressure vessel is detached from the pressure vessel.

18. An apparatus for replacing a control rod drive as set forth in claim 14, wherein said splash preventing means comprises an inner sleeve surrounding said means for attaching and detaching said fastening means, an outer sleeve enclosing the outer circumferential surface of said inner sleeve, sleeve moving means connected to the lower end of said inner sleeve, and an annular seal mounted between the upper end portion of said inner sleeve and the upper end portion of said outer sleeve and pressed by said inner sleeve as the latter moves upwardly, the upward movement of said outer sleeve being prevented by said means for attaching and detaching said fastening means when said outer sleeve has moved upwardly by predetermined distance.

19. An apparatus for replacing a control rod drive as set forth in claim 15, further comprising driving means mounted on said column, said driving means being connected to said control rod drive moving means for driving said control rod drive moving means when said control rod conveying means is mounted on said column.

20. An apparatus for replacing a control rod drive as set forth in claim 16, wherein said splash preventing means comprises an inner sleeve surrounding said means for attaching and detaching said fastening means, an outer sleeve enclosing the outer circumferential surface of said inner sleeve, a sleeve moving means connected to the lower end of said inner sleeve, an annular seal mounted between the upper end portion of said inner sleeve and the upper end portion of said outer sleeve and pressed by said inner sleeve as the latter moves upwardly, and coolant discharge passages formed in said attaching and detaching head of said control rod drive attaching and detaching device for permitting coolant to flow therethrough as the coolant leaks from the pressure vessel when the control rod drive is detached therefrom, the upward movement of said outer sleeve being prevented by said means for attaching and detaching said fastening means when said outer sleeve has moved upwardly by a predetermined distance.

21. An apparatus for replacing a control rod drive as set forth in claim 20, further comprising detecting means mounted in said attaching and detaching head of said control rod drive attaching and detaching device for detecting that said fastening means for attaching said control rod drive to the pressure vessel is detached from the pressure vessel.

22. An apparatus for replacing a control rod drive as set forth in claim 9, wherein said control rod conveying means comprises a cart on which said control rod drive is placed, control rod drive gripping means mounted on said cart for preventing dislodging of said control rod drive from said cart, and a control rod drive moving means for moving said control rod along said cart while the control rod drive is on said cart.

23. An apparatus for replacing a control rod drive as set forth in claim 22, wherein said control rod drive gripping means is moved between an open and closed position by the operation of said control rod drive moving means.

24. An apparatus for replacing a control rod drive as set forth in claim 23, wherein said control rod drive gripping means comprises a pair of rotary shafts mounted on said cart, a pair of grapples each mounted on one of said pair of rotary shafts for gripping said control rod drive, and slide portions each fitted over one of said rotary shafts and moved by said control rod drive moving means along said cart so that said grapples are moved between an opened and closed position by the rotation of said rotary shafts caused by the movement of said slide portions.

25. An apparatus for replacing a control rod drive as set forth in claim 24, further comprising driving means mounted on said column, said driving means being connected to said control rod drive moving means for operating said control rod drive moving means when said control rod conveying means is mounted on said column.

26. An apparatus for replacing a control rod drive as set forth in claim 25, wherein said control rod drive gripping means comprises a pair of rotary shafts mounted on said cart, a pair of grapples each mounted on one of said pair of rotary shafts for gripping said control rod drive, and slide portions each fitted over one of said rotary shafts and moved by said control rod drive moving means along said cart, so that said grapples are moved between an open position and a closed position by the rotation of said rotary shafts caused by the movement of said slide portions.

27. A method of replacing a control rod drive comprising the steps of:
  detaching said control rod drive from a pressure vessel disposed in a containment vessel of a nuclear reactor by means of a control rod drive attaching and detaching device;
  transferring said control rod drive held by said control rod drive attaching and detaching device to a control rod drive conveying means removably mounted on the control rod drive handling device and functioning as a part of the control rod handling device;
  bringing said control rod drive, together with said control rod drive conveying means, into a laterally turned position by an operation of said control rod drive handling device; and
  removing said control rod drive conveying means holding said control rod drive from said control rod drive handling device and moving the same to a predetrmined position.

28. A method of replacing a control rod drive as set forth in claim 27, wherein said control rod drive is brought into the laterally turned position while causing insertion of a top of said control rod drive held in said control rod drive handling device into an opening for moving said control rod drive out of a space in which said revolving device, said control rod drive attaching and detaching device, and said control rod drive handling device are disposed.

* * * * *